United States Patent
Helms et al.

(10) Patent No.: US 9,408,060 B2
(45) Date of Patent: Aug. 2, 2016

(54) INTERLEAVING MULTIPLE BLUETOOTH LOW ENERGY ADVERTISEMENTS

(71) Applicant: RADIUS NETWORKS INC., Washington, DC (US)

(72) Inventors: David Helms, Arlington, VA (US); Marc Wallace, Arlington, VA (US); David Young, Washington, DC (US); Chris Sexton, McLean, VA (US); David Martin, Chantilly, VA (US)

(73) Assignee: RADIUS NETWORKS INC., Washington, DC (US)

( * ) Notice: Subject to any disclaimer, the term of this patent is extended or adjusted under 35 U.S.C. 154(b) by 0 days.

(21) Appl. No.: 14/513,633

(22) Filed: Oct. 14, 2014

(65) Prior Publication Data

US 2016/0105788 A1    Apr. 14, 2016

(51) Int. Cl.
*H04B 7/00*  (2006.01)
*H04W 8/00*  (2009.01)
*H04W 4/00*  (2009.01)

(52) U.S. Cl.
CPC ............. *H04W 8/005* (2013.01); *H04W 4/008* (2013.01)

(58) Field of Classification Search
CPC ..... H04W 4/008; H04W 4/027; H04W 8/005; H04L 67/12
USPC ........ 455/41.2, 456.1, 456.3, 418, 456.6, 439
See application file for complete search history.

(56) References Cited

U.S. PATENT DOCUMENTS

| | | | | |
|---|---|---|---|---|
| 8,051,463 B2* | 11/2011 | Thawani | ................ | H04W 8/20 370/352 |
| 8,369,800 B2* | 2/2013 | Li | ........................ | H04W 52/265 370/338 |
| 8,533,507 B2* | 9/2013 | Vandwalle | ............ | H04W 8/005 370/311 |
| 8,819,219 B2* | 8/2014 | Vandwalle | .............. | H04L 67/16 709/224 |
| 9,066,197 B2* | 6/2015 | Kiukkonen | ....... | H04W 52/0229 |
| 2003/0206535 A1 | 11/2003 | Shpak | | |
| 2005/0151662 A1 | 7/2005 | Kashuba | | |
| 2007/0286136 A1* | 12/2007 | Rittle | .................... | H04W 8/005 370/338 |
| 2009/0161579 A1* | 6/2009 | Saaranen | ............ | H04L 12/2809 370/254 |
| 2009/0280802 A1* | 11/2009 | Chin | ................. | H04W 36/0088 455/426.1 |

(Continued)

FOREIGN PATENT DOCUMENTS

WO     2013079998 A1    6/2013

OTHER PUBLICATIONS

International Search Report and Written Opinion dated Jan. 21, 2015, International Application No. PCT/US2014/061690 filed Oct. 22, 2014, 14 pages.

*Primary Examiner* — Marceau Milord
(74) *Attorney, Agent, or Firm* — Vierra Magen Marcus LLP

(57) ABSTRACT

The present disclosure relates to broadcasting multiple packets at periodic intervals for receipt by other devices. A common device can transmit multiple beacon protocols simultaneously (i.e., an interleaving of different beacons), such that regardless of which protocol a receiving device supports, it may utilize advertisements from that common device (e.g., beacon). Thus, a single or common transmitting device may support multiple advertisements, such that the amount of hardware to be deployed in any network is reduced. Rather than deploying a device per beacon, a single device may be deployed and transmit multiple beacons.

30 Claims, 11 Drawing Sheets

(56) References Cited

U.S. PATENT DOCUMENTS

| | | | |
|---|---|---|---|
| 2010/0233960 A1* | 9/2010 | Tucker | H04L 12/2809 455/41.2 |
| 2011/0153818 A1* | 6/2011 | Vandwalle | H04L 67/16 709/224 |
| 2014/0056220 A1* | 2/2014 | Poitau | H04W 40/246 370/328 |
| 2015/0006633 A1* | 1/2015 | Vandwalle | H04L 67/1051 709/204 |
| 2015/0163828 A1* | 6/2015 | Vandwalle | H04W 28/044 370/330 |

* cited by examiner

INTERLEAVING MULTIPLE BLUETOOTH LOW ENERGY ADVERTISEMENTS

BACKGROUND

1. Field of the Disclosure

The present disclosure relates to broadcasting packets in a network, and in particular, to broadcasting multiple packets at periodic intervals for receipt by other devices.

2. Background Information

Bluetooth™ Low Energy (BLE) devices are designed to broadcast packets that advertise the presence of a BLE enabled device and these advertising packets are transmitted at a periodic interval, such that other BLE devices scanning for the broadcast packets will receive the packets when within range of the transmitting BLE device. In a BLE transmission, RF channels are dedicated for advertising functions that allow the discovery of the transmitting device by other scanning devices (e.g., mobile devices) as they enter the vicinity of the transmitting device. Once a BLE enabled device is discovered and connection is initiated, regular data channels may be used for communication. Two modes of operation in BLE enabled devices exist-advertising mode and scanning mode. In advertising mode, the transmitting BLE enabled device periodically transmits advertising information and may respond with more information upon request from other scanning BLE enabled devices. The scanning BLE enabled device, on the other hand, listens for advertising information transmitted by the transmitting BLE enabled devices, and may request additional information. A BLE enabled device that is transmitting in such a way is referred to as a "beacon."

In a typical implementation, the broadcasted advertising packet data (i.e., the beacon advertisement) will have associated user data, which user data may be associated with a specific content or an application. For example, a store may place a beacon near the store entrance. With BLE enabled mobile devices, the store could provide customers with a mobile device application to monitor for and allow receipt of a beacon's broadcast. In this case, when a user (e.g., customer) having a BLE enabled mobile device nears the entrance of the store, the customer would receive an advertising packet including the store's user data. The received user data could be accessed by the application to provide the customer with content that could be acted upon in real-time (i.e., a "proximity" service). In essence, the beacon's advertisement data acts as a "code" (see, FIG. 3) so that other receiving BLE enable devices can recognize the beacon's transmission. The receiving BLE enabled device may then, for example, provide the "code" to other applications.

DETAILED DESCRIPTION

Figure 1:
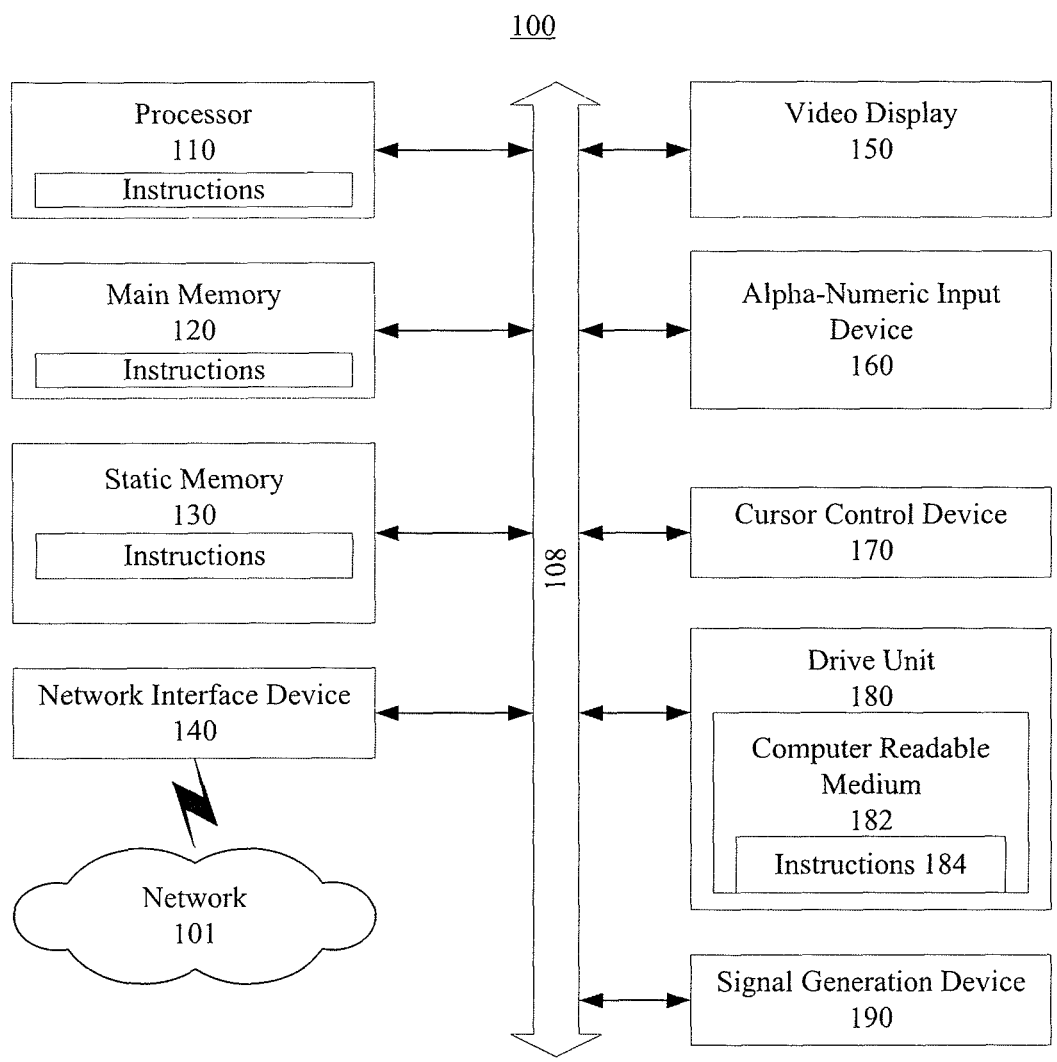
FIG. 1 shows an exemplary general computer system that includes a set of instructions for execution in the exemplary system of the disclosure.

In view of the foregoing, the present disclosure, through one or more of its various aspects, embodiments and/or specific features or sub-components, is thus intended to bring out one or more of the advantages as specifically noted below.

In one exemplary embodiment of the disclosure, there is a method of broadcasting a plurality of data packets at periodic intervals, including setting a transmission interval of at least one data packet such that a transmission rate of the at least one data packet is compatible with a receiver rate of a receiving device within a transmission range of the at least one data packet; populating a portion of the at least one data packet with a first protocol, the first protocol including first protocol data; enabling transmission of the populated at least one data packet and transmitting the populated at least one data packet; and after delaying for an interleave interval, which is a function of the transmission interval, populating the at least one data packet with a second protocol including second protocol data.

In another exemplary embodiment of the disclosure, there is a device for broadcasting a plurality of data packets at periodic intervals, including a controller to: set a transmission interval of at least one data packet such that a transmission rate of the at least one data packet is compatible with a receiver rate of a receiving device within a transmission range of the at least one data packet; populate a portion of the at least one data packet with a first protocol, the first protocol including first protocol data; enable transmission of the populated at least one data packet and transmitting the populated at least one data packet; and after delaying for an interleave interval, which is a function of the transmission interval, populate the at least one data packet with a second protocol including second protocol data.

In still another exemplary embodiment of the disclosure, there is a non-transitory computer readable medium storing a program for broadcasting a plurality of data packets at periodic intervals, the program when executed by a processor including setting a transmission interval of at least one data packet such that a transmission rate of the at least one data packet is compatible with a receiver rate of a receiving device within a transmission range of the at least one data packet; populating a portion of the at least one data packet with a first protocol, the first protocol including first protocol data; enabling transmission of the populated at least one data packet and transmitting the populated at least one data packet; and after delaying for an interleave interval, which is a function of the transmission interval, populating the at least one data packet with a second protocol including second protocol data.

In one aspect of the disclosure, the at least one data packet conforms to a BLE protocol.

In another aspect of the disclosure, the first protocol is an AltBeacon protocol and the second protocol is a protocol different from the AltBeacon protocol.

In still another aspect of the disclosure, the portion of the at least one data packet is a BLE advertisement.

In yet another aspect of the disclosure, the first protocol data is first beacon data and the second protocol data is second beacon data, different from the first beacon data.

In one other aspect of the disclosure, the transmission interval is: BLE Txmt Interval$_{multi}$=BLE Txmt Interval$_{single}$/Number of Interleaved Beacons.

In still one other aspect of the disclosure, the interleave interval is: Beacon Interval=(Repeat Factor)*(BLE Txmt Interval+Delay Offset Factor).

In another aspect of the disclosure, the device further includes broadcasting the at least one data packet at the transmission interval.

In yet another aspect of the disclosure, the transmission interval includes at least one of a random delay and coordinated random delay, wherein the coordinated random delay is one of a pseudo-random value and a program generating a random delay.

In still another aspect of the disclosure, a transmit notification is provided upon transmission of the populated at least one data packet.

Methods described herein are illustrative examples, and as such are not intended to require or imply that any particular process of any embodiment be performed in the order presented. Words such as "thereafter," "then," "next," etc. are not intended to limit the order of the processes, and these words are instead used to guide the reader through the description of the methods. Further, any reference to claim elements in the singular, for example, using the articles "a," "an" or "the", is not to be construed as limiting the element to the singular.

FIG. 1 is an illustrative embodiment of a general computer system, on which a method of active records for interactive systems can be implemented, and which is shown and is designated 100. The computer system 100 can include a set of instructions that can be executed to cause the computer system 100 to perform any one or more of the methods or computer based functions disclosed herein. The computer system 100 may operate as a standalone device or may be connected, for example, using a network 101, to other computer systems or peripheral devices.

In a networked deployment, the computer system 100 may operate in the capacity of a server or as a client user computer in a server-client user network environment, or as a peer computer system in a peer-to-peer (or distributed) network environment. The computer system 100 can also be implemented as or incorporated into various devices, such as an call interceptor, an IVR, a context manager, an enrichment subsystem, a message generator, a message distributor, a rule engine, an IVR server, an interface server, a record generator, a data interface, a filter/enhancer, a script engine, a PBX, stationary computer, a mobile computer, a personal computer (PC), a laptop computer, a tablet computer, a wireless smart phone, a personal digital assistant (PDA), a global positioning satellite (GPS) device, a communication device, a control system, a web appliance, a network router, switch or bridge, a web server, or any other machine capable of executing a set of instructions (sequential or otherwise) that specify actions to be taken by that machine. The computer system 100 can be incorporated as or in a particular device that in turn is in an integrated system that includes additional devices. In a particular embodiment, the computer system 100 can be implemented using electronic devices that provide voice, video or data communication. Further, while a single computer system 100 is illustrated, the term "system" shall also be taken to include any collection of systems or sub-systems that individually or jointly execute a set, or multiple sets, of instructions to perform one or more computer functions.

As illustrated in FIG. 1, the computer system 100 includes a processor 110. A processor for a computer system 100 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. A processor is an article of manufacture and/or a machine component. A processor for a computer system 100 is configured to execute software instructions in order to perform functions as described in the various embodiments herein. A processor for a computer system 100 may be a general purpose processor or may be part of an application specific integrated circuit (ASIC). A processor for a computer system 100 may also be a microprocessor, a microcomputer, a processor chip, a controller, a microcontroller, a digital signal processor (DSP), a state machine, or a programmable logic device. A processor for a computer system 100 may also be a logical circuit, including a programmable gate array (PGA) such as a field programmable gate array (FPGA), or another type of circuit that includes discrete gate and/or transistor logic. A processor for a computer system 100 may be a central processing unit (CPU), a graphics processing unit (GPU), or both. Additionally, any processor described herein may include multiple processors, parallel processors, or both. Multiple processors may be included in, or coupled to, a single device or multiple devices.

Moreover, the computer system 100 includes a main memory 120 and a static memory 130 that can communicate with each other via a bus 108. Memories described herein are tangible storage mediums that can store data and executable instructions, and are non-transitory during the time instructions are stored therein. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. A memory describe herein is an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted.

As shown, the computer system 100 may further include a video display unit 150, such as a liquid crystal display (LCD), an organic light emitting diode (OLED), a flat panel display, a solid state display, or a cathode ray tube (CRT). Additionally, the computer system 100 may include an input device 160, such as a keyboard/virtual keyboard or touch-sensitive input screen or speech input with speech recognition, and a cursor control device 170, such as a mouse or touch-sensitive input screen or pad. The computer system 100 can also include a disk drive unit 180, a signal generation device 190, such as a speaker or remote control, and a network interface device 140.

In a particular embodiment, as depicted in FIG. 1, the disk drive unit 180 may include a computer-readable medium 182 in which one or more sets of instructions 184, e.g. software, can be embedded. Sets of instructions 184 can be read from the computer-readable medium 182. Further, the instructions 184, when executed by a processor, can be used to perform one or more of the methods and processes as described herein. In a particular embodiment, the instructions 184 may reside completely, or at least partially, within the main memory 120, the static memory 130, and/or within the processor 110 during execution by the computer system 100.

In an alternative embodiment, dedicated hardware implementations, such as application-specific integrated circuits (ASICs), programmable logic arrays and other hardware components, can be constructed to implement one or more of the methods described herein. One or more embodiments described herein may implement functions using two or more specific interconnected hardware modules or devices with related control and data signals that can be communicated between and through the modules. Accordingly, the present disclosure encompasses software, firmware, and hardware implementations. Nothing in the present application should be interpreted as being implemented or implementable solely with software and not hardware such as a tangible non-transitory processor and/or memory.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

In conventional Bluetooth Low Energy (BLE) enabled systems and devices, a beacon is a single instance of a beacon protocol and its data that will be repeatedly transmitted. Commonly available firmware and hardware implementing the BLE specifications are also designed to transmit a single protocol and its data repeatedly.

The disclosure below specifies an approach such that a system and/or device can transmit multiple beacon protocols and data on commonly available firmware and hardware. This allows a single hardware device to broadcast multiple beacon protocols and data, without having to provide specific hardware per beacon.

Figure 2:
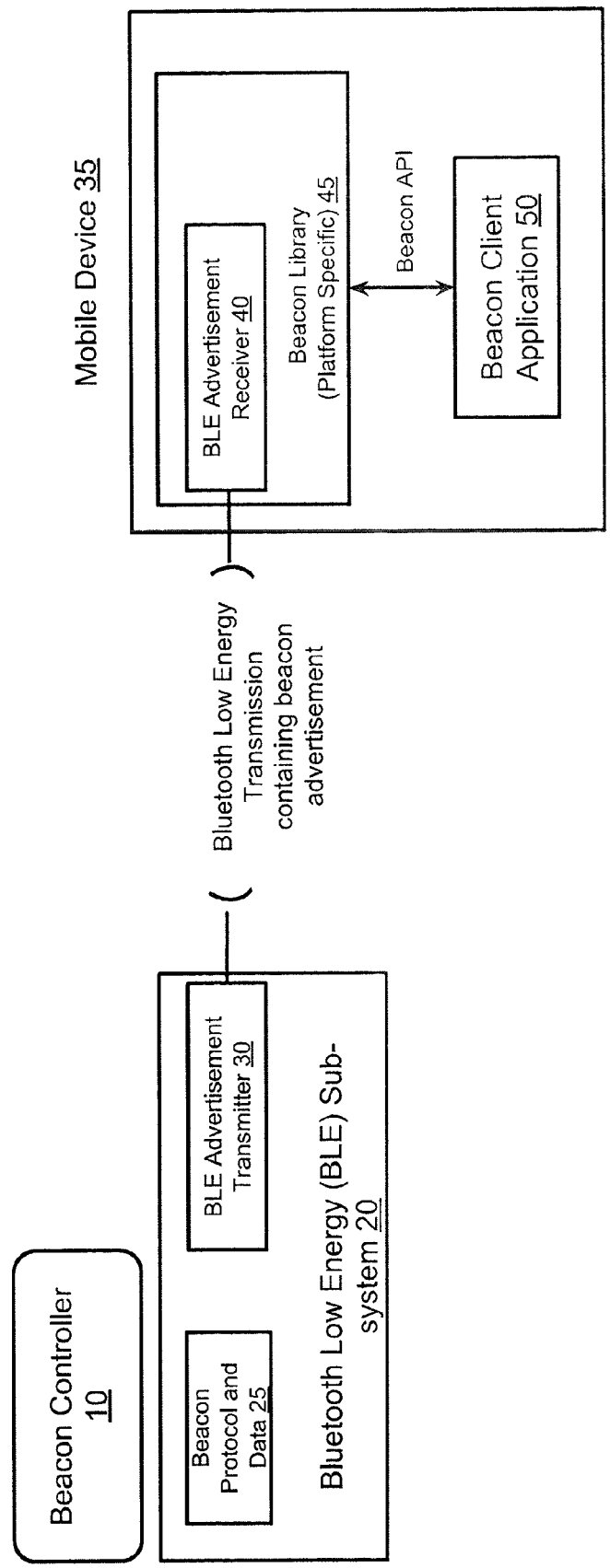
FIG. 2 shows an exemplary system with a controller and mobile device in accordance with one embodiment of the disclosure.

FIG. 2 shows an exemplary system with a controller and mobile device in accordance with one embodiment of the disclosure. The exemplary system includes, for example, a beacon controller 10, a Bluetooth™ Low Energy (BLE) Sub-system 20 and a mobile device 35, which communicate via a BLE transmission having a beacon advertisement. The BLE Sub-system 20 includes the beacon protocol and data 25 and a BLE advertisement transmitter 30. The mobile device 35 includes a beacon client application 50 and a beacon library 45 with a BLE advertisement receiver 40. It is appreciated that the depicted system is exemplary and may include any number of features and components as readily understood by the skilled artisan. The beacon controller 10 and mobile device 35 communicate, in this example, using a BLE transmission containing the beacon advertisement.

Figure 3:
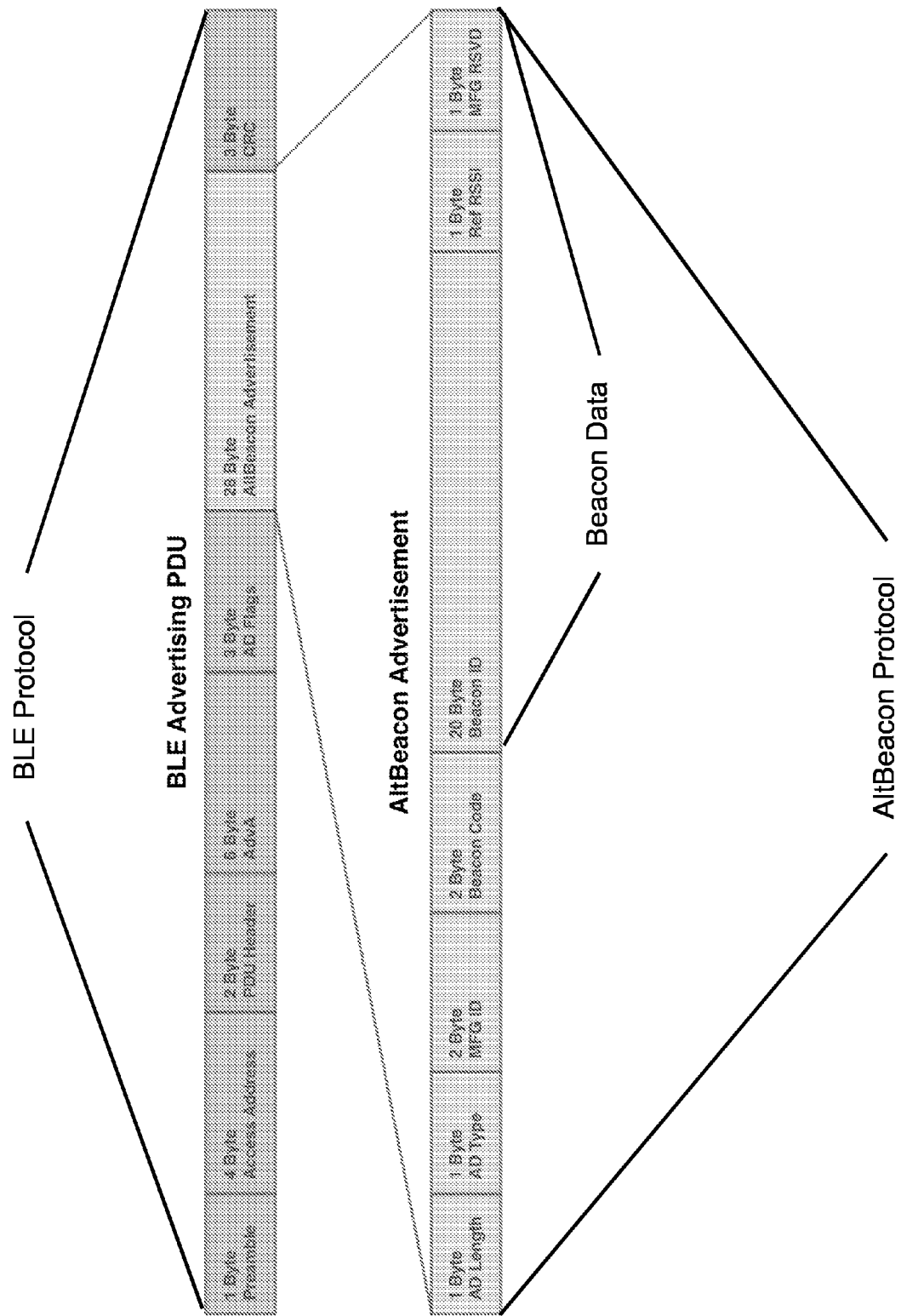
FIG. 3 shows an exemplary protocol and data diagram in accordance with one embodiment of the disclosure.

In the exemplary system, in order for a beacon advertisement to be useful, both the transmitter 30 of BLE Sub-system 20 and the receiver(s) 40 of the mobile device 35 should operate using the same protocol. As appreciated, beacons may use different protocols to transmit data. FIG. 3 shows an exemplary protocol and data diagram in accordance with an embodiment of the disclosure. For example, in a BLE enabled device, transmission uses the BLE protocol which includes a preamble, access address, PDU header, AdvA, AD flags, BLE advertisement (shown here as an AltBeacon Advertisement) and CRC. Another protocol that may be used to transmit data is the AltBeacon protocol. The AltBeacon protocol is labeled in FIG. 3 as an AltBeacon Advertisement that includes an AD length, AD type, MFG ID, beacon code, beacon ID, Ref RSSI and MFG RSVD. In the disclosed embodiment, the AltBeacon advertisement is embedded as part of the BLE protocol beacon advertisement, as illustrated in FIG. 3. For example, in FIG. 3 the AltBeacon protocol is embedded into the BLE advertisement packet.

More specifically, AltBeacon is a protocol specification that defines a message format for proximity beacon advertisements. AltBeacon proximity beacon advertisements are transmitted by transmitting BLE enabled devices to signal their proximity to nearby receiving or scanning BLE enabled devices. The contents (data) of the emitted advertisement contains information that the receiving BLE enabled device can use to identify the beacon (transmitting BLE enabled device) and to compute its relative distance to the beacon. The receiving device (receiving BLE enabled device) may use this information as a contextual trigger to execute procedures and implement behaviors that are relevant to being in proximity to the transmitting beacon. Examples of using proximity beacons include, but are not limited to:

Notifying users of special offers as they visit areas within a department store.

Presenting opportunities to explore additional information about an exhibit to a museum visitor.

Automatically checking in with a restaurant's reservation system as the customer arrives.

Many beacon protocols reserve a portion of the protocol that allows for customized data. As illustrated in FIG. 3, the AltBeacon specification has 20 bytes reserved for a "Beacon ID" that can be used for applications using the protocol to identify specific beacon devices. Other beacon protocols also have sections reserved to transmit IDs that can specifically identify beacon devices. A conventional beacon device transmits a fixed beacon advertisement of a given protocol, and a receiving device using the same protocol is able to interpret the data embedded within that protocol. As a result, multiple beacons are required in order to transmit using different protocols. Accordingly, there is a need to have multiple beacons transmitting multiple protocols in order to support receiving devices using different protocols. For example, with reference to FIG. 2, the BLE Sub-system 20 is controlled by beacon controller 10 and transmits a single beacon protocol and data 25 via the BLE advertisement transmitter 30. The transmission is received at mobile device 35 via the BLE advertisement receiver 40, and the contents (data) contained as part of the transmission (packet of data) may be interpreted only if the mobile device 35 is using the same protocol (e.g., both devices are using the AltBeacon protocol). If the devices are transmitting and/or receiving using a different protocol, that communication between the devices will not occur.

In one embodiment of the disclosure, a common device can transmit multiple beacon protocols simultaneously (i.e., an interleaving of different beacons), such that regardless of which protocol a receiving device supports, it could utilize the advertisements from that beacon. Thus, a single or common transmitting device may support multiple beacon advertisements. As a result, the amount of hardware to be deployed in any network is reduced. Rather than deploying a device per beacon, a single device may be deployed and transmit multiple beacons. Reducing the number of devices means fewer things for customers to manage and configure, better utilization of space and electrical resources (for plug-in devices), etc.

Although the beacon device may transmit multiple and different protocols, it is appreciated that each beacon device is not limited to such an embodiment. For example, the beacon device may support only a specific protocol, whether for backwards compatibility, application compatibility or other reasons. However, the beacon device may also be expanded to including other platforms that may not be supported by the original or previously installed beacon protocol. Thus, if the beacon device is expanded or modified to deploy additional protocols, that beacon device may support legacy protocols in addition to any other protocols installed or enabled on the beacon device. Therefore, the beacon device can integrate other protocols (other platforms, thus broader customer base), such that new platforms may require porting of applications, without the purchase of additional beacon hardware. Additionally, data included in the beacon could be equivalent across the different protocols to provide common data to multiple platforms having the different protocols. For example, it might be desirable to have a common beacon "code" embedded in the beacon data, and even though the "code" may be transmitted by different protocols, the different platforms would still interpret that particular code in a common way.

With continued reference to FIG. 2, the BLE Sub-system 20 will transmit a beacon protocol and data, and any BLE receiving device 35 in the vicinity receives the beacon advertisement (FIG. 3). The BLE advertisement receiver 40 decodes the BLE core protocol from the BLE advertisement, and passes the decoded bytes to the platform specific beacon library 45 (where a platform is, for example, a mobile device operating system such as iOS, Android, Windows Mobile, etc. However, it is appreciated that the platform is not limited to these examples.). A given platform's beacon library 45 may not support all beacon protocols. For supported protocols, the beacon would "expose" them via the Beacon API and to client applications 50 that would interact with any beacons in proximity.

Given that different beacon protocols exist (i.e., no common beacon protocol), none of which are common to all mobile device platforms, it is desirable to find a way for beacon enabled locations to support a wider range of beacon protocols. One conventional approach is to install multiple beacon transmitting devices, each device specific to a given beacon protocol. For example, one device may transmit data using iBeacon™ technology to work with supported iOS™ devices, whereas another device may transmit using the Alt-Beacon open format protocol. However, this approach requires twice the hardware, and duplicative management of beacon protocols and data.

In one embodiment of the instant disclosure, different beacon protocols share a BLE Sub-system. For example, each beacon protocol utilizes the hardware of the BLE Sub-system in turn. That is, by interleaving protocols and using existing BLE Sub-system interfaces, multiple protocols on a common, readily available hardware system may be achieved. It is appreciated that the exemplary embodiment refers to a common hardware system. However, the term common is not intended to limit the disclosure to a single hardware device.

Figure 4:
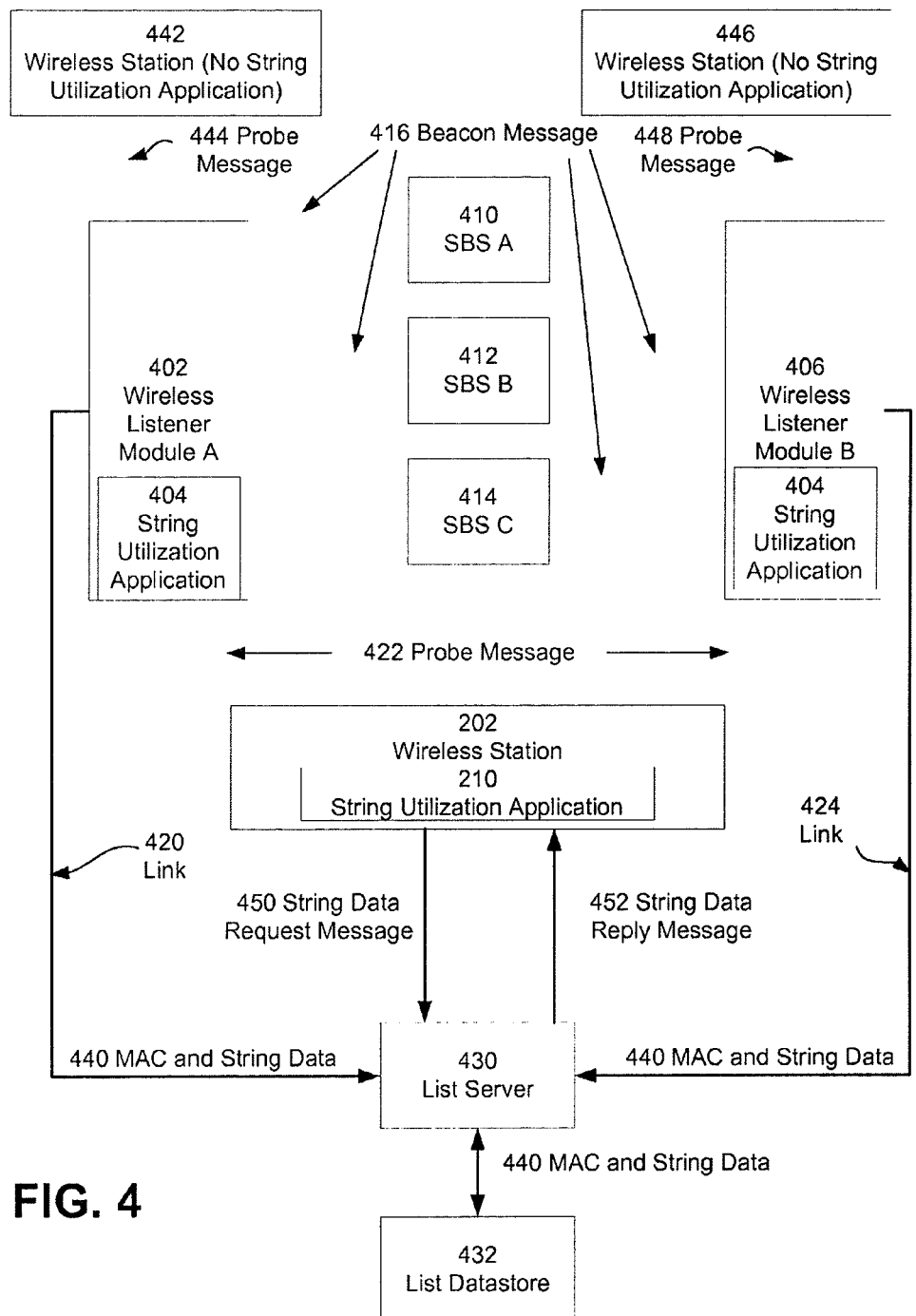
FIG. 4 is a flow block illustrating operations performed by a listener module according to an embodiment.

FIG. 4 is a block diagram illustrating operations performed by a listener module according to an embodiment. In the described embodiments below, a listener module is synonymous with a receiving device, such as a BLE enabled receiving device, and a string broadcast station is synonymous with a transmitting device, such as a BLE enabled transmitting device. It is also appreciated that a wireless station may be any wireless device, including those noted in the disclosure above. Of course, the wireless listener module and the wireless station may be separate entities (as illustrated) or the same entity (e.g. the wireless station has BLE enable receiving capabilities).

Wireless listener module A and B (elements 402 and 406) are configured to listen for beacon messages 416 transmitted by string broadcast stations, such as SBS A, SBS B and SBS C (elements 410, 412 and 414). In an embodiment, an SBS beacon message 416 comprises a network information string. A wireless listener module (elements 402 and 406) operating a string utilization application (element 404) receives one or more beacon messages 416 and obtains the network information string from each received beacon message. The wireless listener modules (elements 402 and 406) also receive a probe message 422 from a wireless station 202. The probe message includes the media access controller (MAC) address of the wireless station 202. Wireless station 202 operates string utilization application 210. In another embodiment, wireless listener module 402 also receives probe message 444 from wireless station 442. The probe message 444 includes the media access controller (MAC) address of the wireless station 442. Wireless station 442 does not operate an instance of the string utilization application 210. Similarly, wireless listener module 404 also receives probe message 448 from wireless station 446. The probe message includes the MAC address of the wireless station 446. Wireless station 446 also does not operate an instance of the string utilization application 210. Thus, a wireless listener module receives probe and beacon messages from wireless stations and SBSs that are within range of the wireless listener module. In an embodiment, a wireless listener module, such as module A and B, may also be configured to operate as an SBS and broadcast an SBS beacon message that comprises a network information string.

A wireless listener module, such as wireless listener module A, 402 associates the MAC address of the wireless station 202, the MAC address of wireless station 442, the MAC address of wireless station 444 and the MAC address of listener module A with the network information strings received from each beacon message 416 and sends the information strings and the MAC addresses to a list data server 430 for storage in a listener datastore 432. The wireless listener module A 402 may also provide a timestamp that indicates when the wireless station 202 was proximate to the listener module A 402.

As illustrated in FIG. 4, wireless listener module A 402 connects to the list data server 430 via a link 420 and wireless listener module B 406 connects to list data server 430 via link 422. The links 420 and 422 may be wireless links, such as via a wireless LAN or a wireless telephone network, or may be a wired link, such as via DSL line, a cable network, or a fiber network. In another embodiment, wireless listener modules A 402 and B 406 communicate with each other and other wireless listener modules via a mesh network (not illustrated).

Using an instance of the string utilization application 210, the wireless station 202 may send a string data request message 450 for a list of network information strings proximate to its current location from the list server that have been reported by one or more listener modules, such as wireless listener module A 402, that have also detected the probe message and the MAC address of the wireless station 420. The string data request message 450 includes the MAC address of the wireless station 202. The list server 440 may respond to the string data request message by acquiring a list of network information strings associated with the MAC address of the wireless station 202 from the listener datastore 432 and sending the list to the wireless station 202 in string data response message.

In an embodiment, a wireless listener module, such as wireless listener module A 402, may listen for probe messages periodically. The time of receipt of a probe message 422 is captured by a time stamp. When a wireless station moves out of range of the wireless listener module A 402, the elapsed time between a current time and the time indicated by a last time stamp will increase. This elapsed time period may be used by the datastore 442 to measure the age of data relating to a MAC address and to log data (for example, MAC address and associated network information strings) to the listener datastore 432 or to delete data of a particular age.

While FIG. 4 illustrates two listener modules A and B, the illustration is not limiting. Any number of listener modules may be deployed in a physical space to form a listener network. Because the location of each listener module within the listener network is known, the location of a wireless station that broadcasts a probe message (without regard to whether the wireless station operates a string utilization application) may be tracked within the listener network.

Figure 5A:
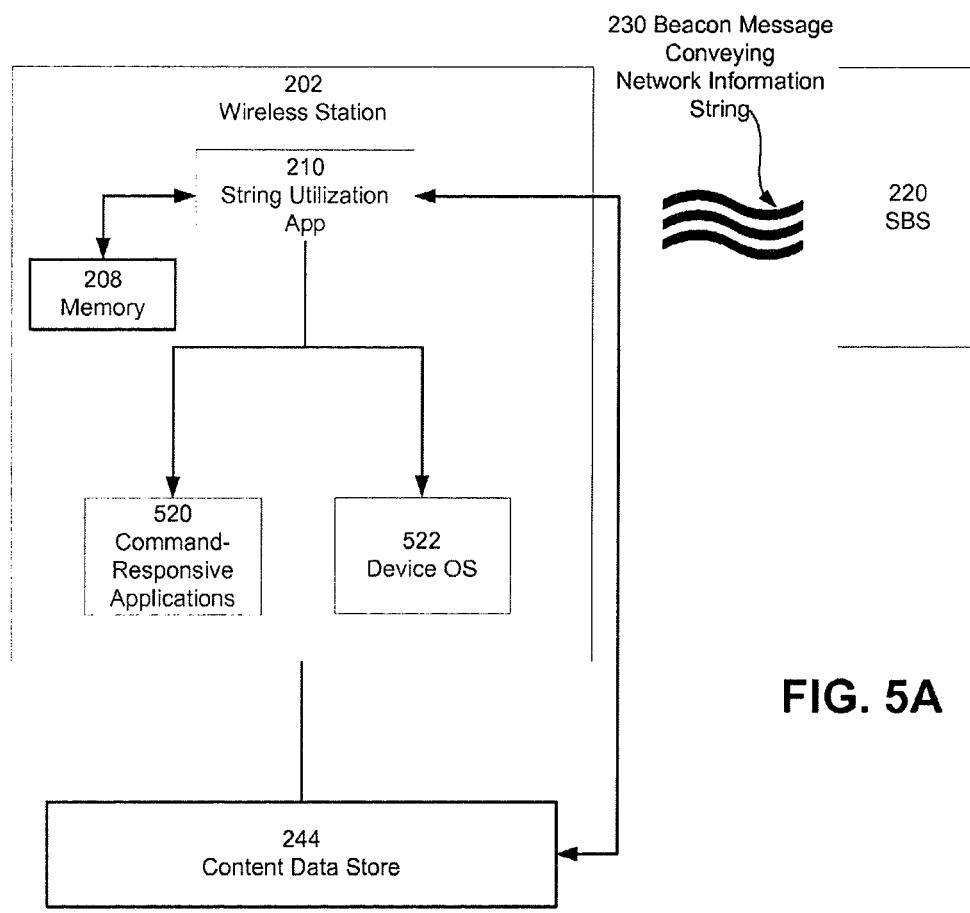
FIG. 5A is a block diagram illustrating the operation of a wireless station in response to receipt of a network information string according to an embodiment.

FIG. 5A is a block diagram illustrating the operation of a wireless station in response to receipt of a network information string according to an embodiment. In an embodiment, a wireless station 202, such as, for example and without limitation a Wi-Fi enabled device, is configured with a string utilization application (string utilization application) 210 executed by processor 206 (not illustrated). By way of illustration and not by way of limitation, the wireless station 202 may be a cell phone, a smart phone, a laptop computer, a vending machine or a cash register.

The memory 208 and the content datastore 244 may include a list of network information strings that are associated with command codes, which list is accessible to string utilization application 210. The wireless station 202 may receive one or more beacon messages, including beacon message 230, from the string broadcast station 220. The string utilization application 210 examines the network identifier (for example and not as a limitation, an SSID) of each beacon message. In an embodiment, the string utilization application 210 may determine if the network identifier contains a network information string on the command code list stored in memory 208. Alternatively, the string utilization application 210 may forward a received network information string to information string server 240 (not illustrated). The string server 240 may respond with content that is stored in content datastore 244 that includes a command code.

When the string utilization application 210 receives a listed network information string associated with a command code that is stored in memory 208 or content datastore 244, the string utilization application 210 refers the listed command code to a command-responsive application 520 or to the operating system 522 of the wireless station. The command-responsive application 520 and the operating system 522 may be configured to take an action in response to the receipt of the command code. For example, the command-responsive application 520 may be a browser that is configured to open a particular web page in response to a particular command code. The device operating system 522 may be configured to load a command-responsive application 520 from memory or to download a command-responsive application from the Internet. Other actions may include displaying a reminder message or playing audio content.

Figure 5B:
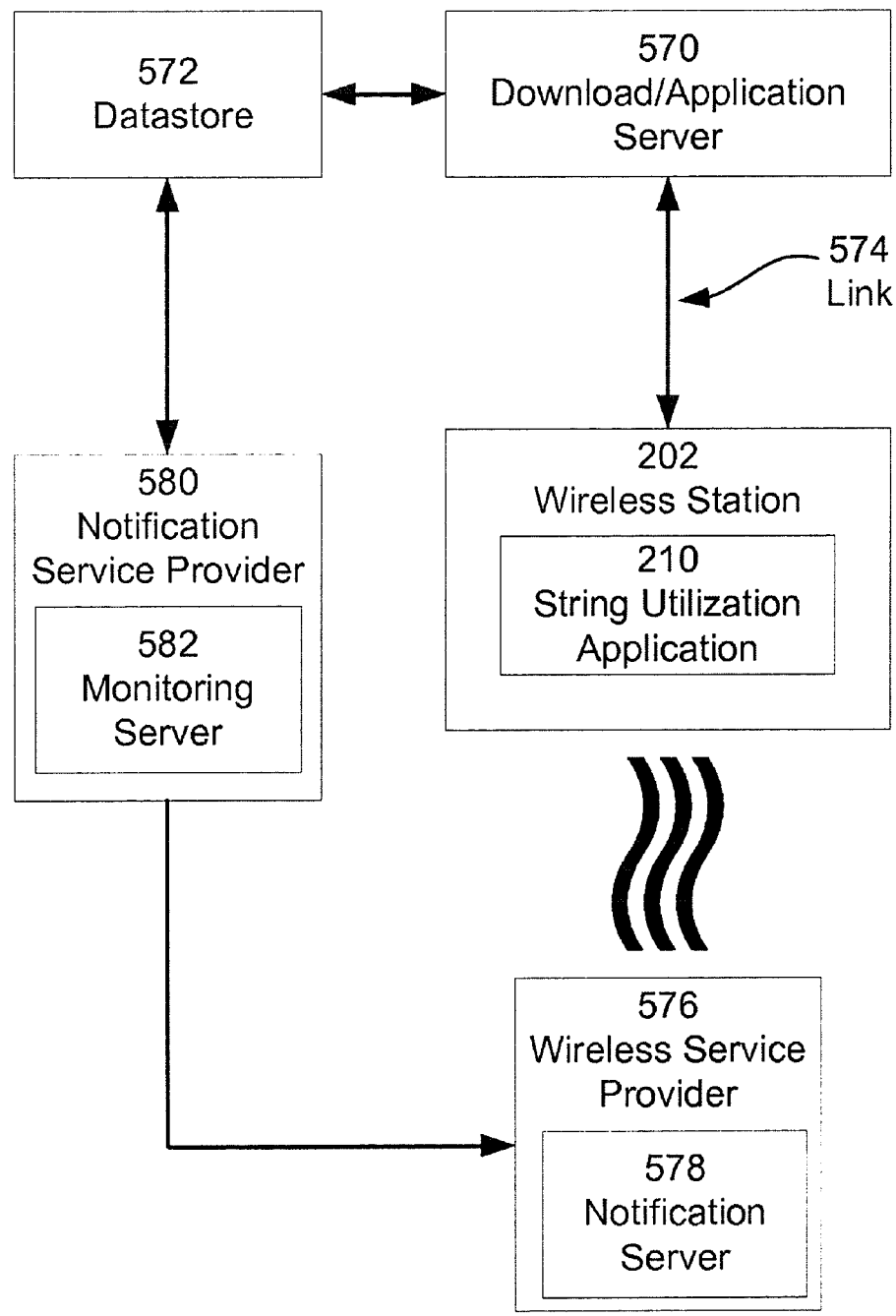
FIG. 5B is a block diagram illustrating a process for triggering a wireless station to take an action according to an embodiment.

FIG. 5B is a block diagram illustrating a process for triggering a wireless station to take an action according to an embodiment. In an embodiment, the string utilization application 210 is downloaded from a download/application server 570 to a wireless station 202 that receives wireless services from a wireless service provider 576. During the installation process, the download/application server 570 acquires wireless station information, including its MAC address and a unique token, and user information and stores the station and user information in a datastore 572. The wireless station 202 may be configured to receive a notification from the wireless service provider and to initiate a response based on this notification. In an embodiment, the string utilization application 210 is configured by a listener service provider 580 to respond to the receipt of the notification in a particular way.

In an embodiment, the notification service provider 580 monitors one or more wireless listener modules, such as wireless listener module A 402 as illustrated in FIG. 4, via a monitoring server 582. When the presence of the wireless station 202 is detected in proximity to a particular wireless listener module, the monitoring server 582 may send a message to the wireless service provider 576 to send a notification to the wireless station 202. The message from the monitoring server 582 to the wireless service provider 576 includes the unique token associated with the wireless station 202. The notification service provider 576 directs notification server 578 to send the notification to the wireless station 202, based on the unique token sent from the monitoring server. The receipt of the notification by the wireless station 202 conveys a location-relevant instruction to the string utilization application 210 operating on the wireless station 202. By way of illustration and not by way of limitation, the instruction may cause the wireless station 202 to download a coupon for a nearby merchant, render content, operate an application, connect to a website, etc.

The full details of the listener module and software application may be found in U.S. Patent Publication No. 2012/0294235, the contents of which are hereby incorporated by reference.

Figure 6A:
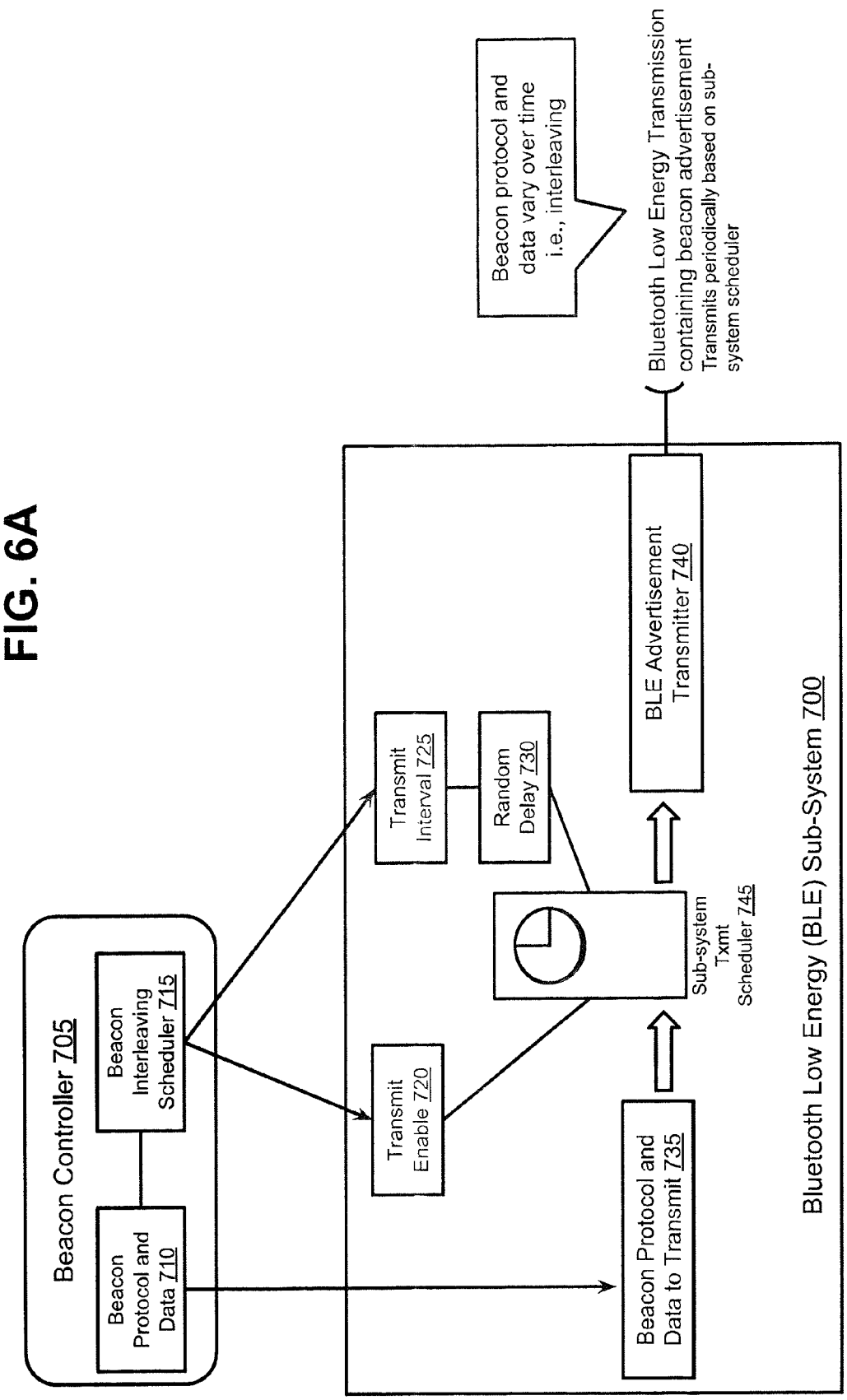
FIG. 6A shows an exemplary embodiment of a controller in accordance with one embodiment of the disclosure.

FIG. 6A shows an exemplary embodiment of a controller in accordance with one embodiment of the disclosure. BLE Sub-system 700 receives from the beacon controller 705, for example, a transmit enable command 720, a transmit interval command for setting the interval of repeated transmissions 725, a beacon protocol and data to transmit instructions 735, and includes a BLE advertisement transmitter 740, a Sub-system transmit scheduler 745, and a component for introducing random delay in physical transmissions 730. The BLE Sub-system 700 is controlled by the beacon controller 705, which includes, for example, an interleaving scheduler 715 that transmits the transmit enable command 720 and transmit interval setting 725. The beacon controller 705 also transmits beacon protocol and data 710 and the transmit scheduler 745 may introduce a random delay 730 to avoid collisions/interference in the case where many BLE Sub-systems are in the same vicinity. Although the beacon controller 705 is illustrated as a separate component from the BLE Sub-system 700, it may also be included as part of the BLE Sub-system 700 itself.

In general, a BLE Sub-system will accept, for example, three sets of data relevant to beacon transmissions (although not limited to three sets of data):

The sequence of bytes that make up the beacon protocol and a data payload to be embedded in the BLE advertisement;

A mechanism for starting or enabling the BLE advertisement process; and

The interval to broadcast the BLE advertisement.

In order to transmit multiple beacon protocols, at least the following four sets of data are utilized (although not limited to four sets of data):

Set the transmit interval (i.e., interval=1/rate) of the BLE Sub-system;

Provide the set of beacon protocols and data to be transmitted;

Enable the BLE advertisement transmission; and

Periodically adjust the BLE transmission to using one of the protocols (from the set above).

In one exemplary flow of the BLE Sub-system 700, (1) the transmission interval of the BLE Sub-system is set by the Beacon Controller 705 (or any other device controlling the transmission interval), (2) the transmission with the initial beacon protocol and data is set and the transmit enable command is issued by the Beacon Controller 705 (3) after a period of time (the "beacon interval"), the transmission with the next set of beacon protocol and data is set and transmission enabled by the Beacon Controller 705 (or any other device controlling the transmission interval), and (4) the process is repeated as necessary.

The stages in the above process are not alone sufficient to have a functioning multi-beacon transmitter. Rather, a relationship between the "beacon interval" and the physical BLE transmit interval should also exist.

A beacon interval is defined as the time period used by the beacon controller 705 to "switch out" (i.e., exchange) the beacon protocol used by the BLE Sub-system 700. This beacon interval is a logical interval that is outside of and independent from BLE Sub-system transmit interval. That is, the BLE Sub-system 700 is unaware whether one or a set of beacons are being transmitted and unaware of the interval to alternate between the set of beacons. Rather, the number of beacons to be transmitted and the interval at which beacons are alternated is controlled by the beacon controller 705. The switching or exchanging of beacons is similar to the process for initiating a sole (i.e., non-changing) beacon transmission. However, the beacon controller 705 will re-initialize the BLE Sub-system 700 to change to a different set of data after a period of time. A discussion of the beacon interval and BLE transmit interval used in the BLE Sub-system 700 will be described with reference to FIG. 8 below.

Figure 6B:
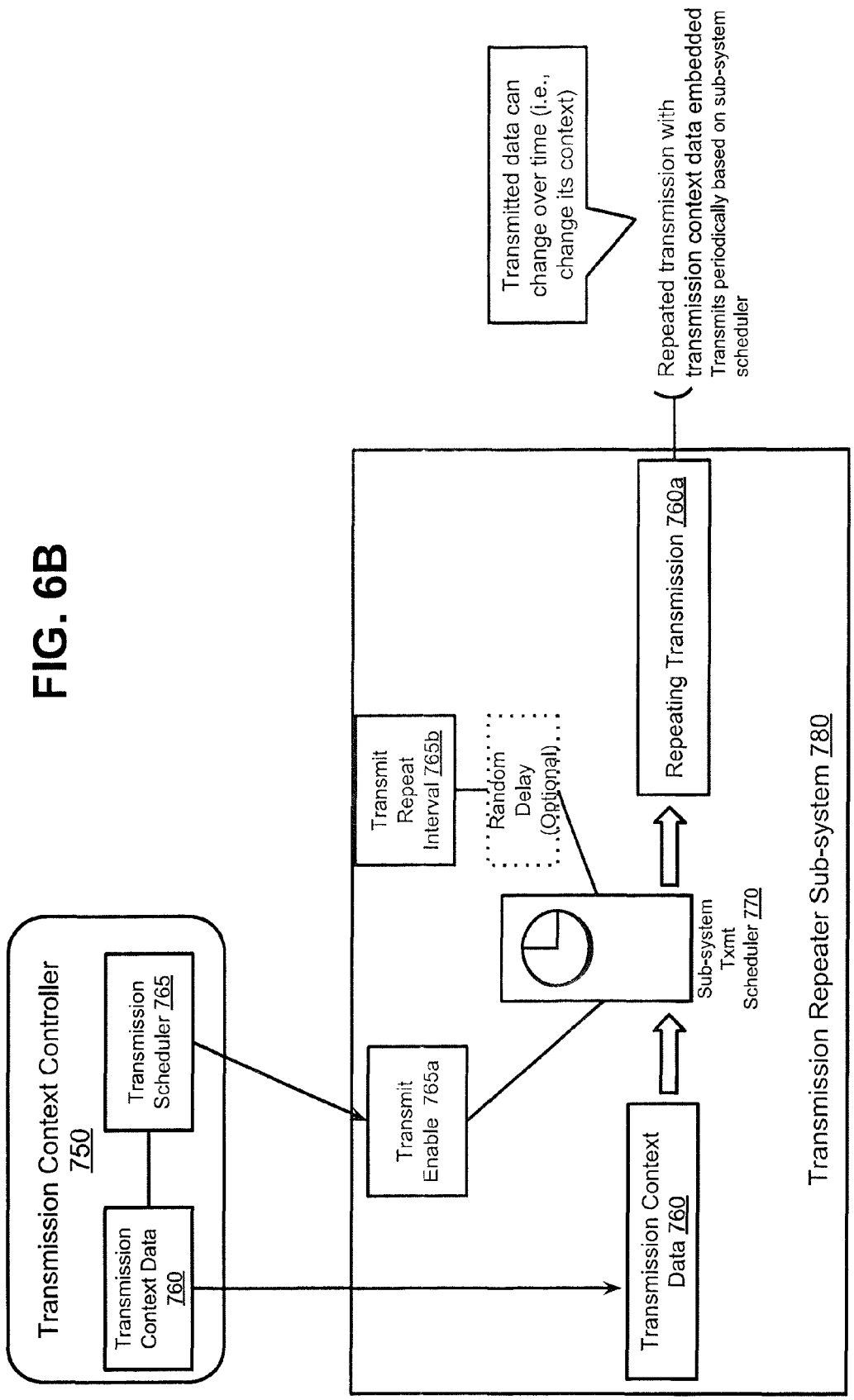
FIG. 6B shows an exemplary controller and transmission/repeater sub-system in accordance with a generic system.

FIG. 6B shows an exemplary controller and transmission/repeater sub-system in accordance with a generic system. In the system illustrated, parameters are set such that a sub-system repeats specified transmission data on a given transmission, and a controller system can (at a minimum) set the data and initiate the transmission. Using these parameters, a system can be created such that, rather than the subsystem transmitting repeated data, the data can change over time. This is in contrast to the system illustrated in FIG. 7A, in which the beacon controller 705 can control the transmit interval and a random delay component 730 exists in the BLE Sub-system 700. In a generic system, the transmit interval does not need to be specified by the beacon controller 705, nor does there need to be a random delay component 730 in the BLE Sub-system 700. As described below, these components are not required in a "generic" (i.e., non-BLE) system.

As illustrated in FIG. 6B, such an exemplary system may include a transmission context controller 750 and a transmission repeater sub-system 780. The transmission context controller 750 includes transmission context data 760 for transmission, and a transmission scheduler 765 which provides a transmit enable command 765*a* to the transmission repeater sub-system 780. The transmission repeater sub-system 780 includes a sub-system transmit scheduler 770, which receives the transmission context data 760 from the transmission context controller 750 and outputs a repeating transmission 760*a*. The repeated transmission 760*a* includes transmission context data 760 embedded therein and may be transmitted periodically based on the sub-system transmit scheduler 770. The transmitted data 760*a* is the transmission context data 760, repeatedly transmitted at intervals set by the Sub-system Transmit scheduler. The embedded transmission context data 760 can change over time based on the transmissions received by the transmission context controller 750 from the Transmission Context Controller 750.

If the transmit interval is fixed in the transmission context controller 750 (i.e., not modifiable by the transmission context controller 750), then the transmission interval does not change. Thus, the interval at which the transmission context data 760 rotates would be calculated from the fixed interval. That is, the formula:

Beacon Interval=(Repeat Factor)*(BLE Txmt Interval+Delay Offset Factor)

or the generic equivalent:

Context Interval=(Repeat Factor)*(Transmit Repeat Interval+Offset Factor)

applies. However, as noted above for the generic case, the transmission context controller 750 is not able to change the transmit repeat interval 765*b*. Accordingly, the perceived beacon transmit rate would be slower than the BLE Sub-system transmit rate by a factor equal to the number of beacons being transmitted.

Additionally, in the exemplary system illustrated in FIG. 6B, there may not be any random delay generated. That is, generation of a random delay is optional. If this is the case, the offset factor in the formula above is not strictly necessary (i.e., it can be zero). However, there may be cases where it would be useful to have an offset.

Multiple Simultaneous Beacons

Figure 7:
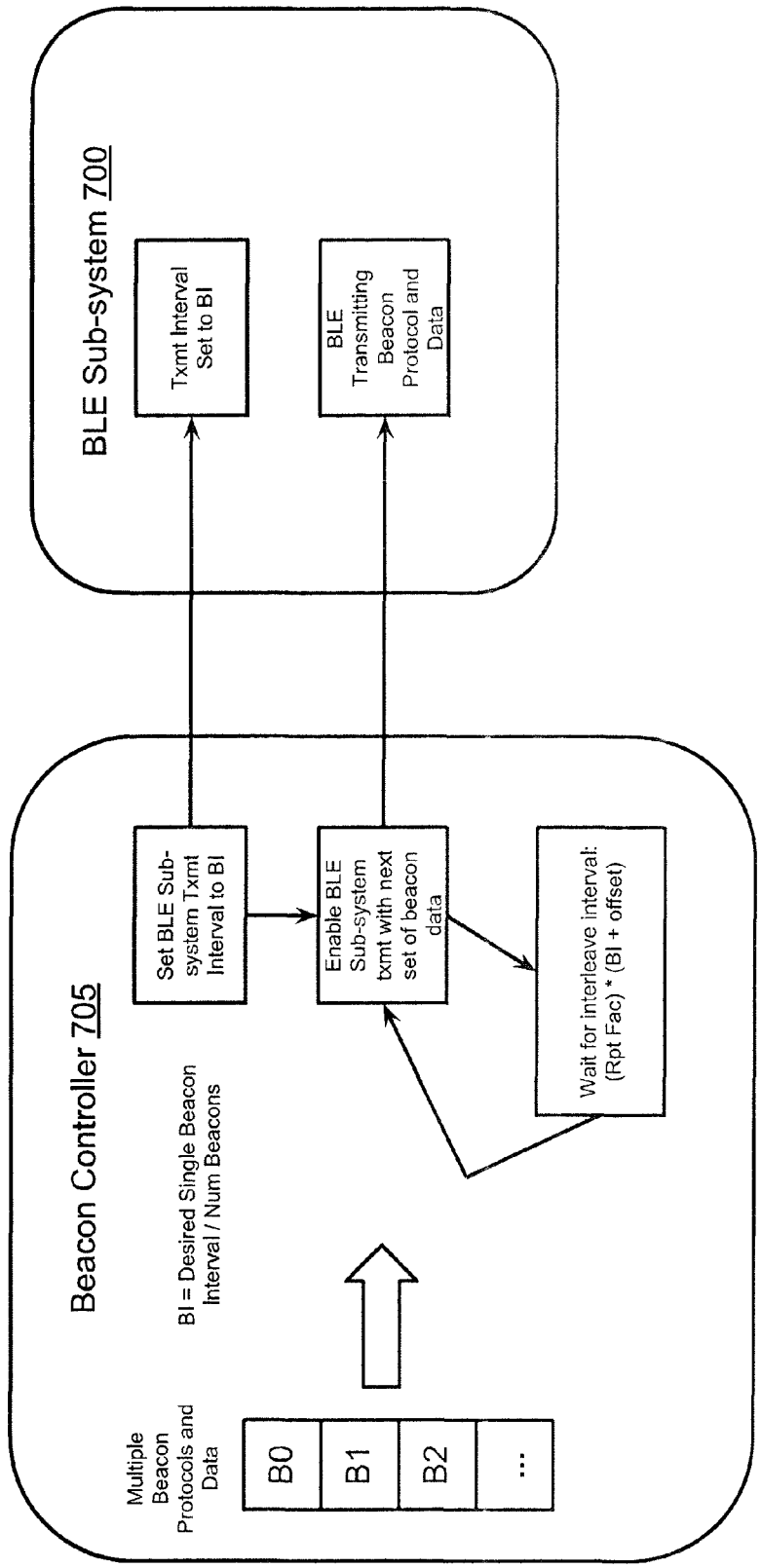
FIG. 7 shows an exemplary flow diagram of multiple and simultaneous data transmission in accordance with one embodiment of the disclosure.

FIG. 7 shows an exemplary flow diagram of multiple and simultaneous data transmission in accordance with one embodiment of the disclosure. In the non-limiting exemplary embodiment, the beacon controller 705 sets the BLE Sub-system 700 transmission interval such that each individual beacon transmission rate matches the desired client rate using the following formula:

BLE Txmt Interval$_{multi}$=BLE Txmt Interval$_{single}$/Number of Interleaved Beacons The beacon controller 705 then populates the initial beacon protocol and data and enables transmission on the BLE Sub-system 700. As a result, the beacon is broadcast by BLE Sub-system 700. The beacon controller 705 allows the beacon to transmit for the interval given by the formula:

Beacon Interval=(Repeat Factor)*(BLE Txmt Interval+Delay Offset Factor)

When the interval ends, the beacon controller 705 retrieves the next beacon's protocol and data, propagates the data to the BLE Sub-system 700, and enables the transmission on the BLE Sub-system 700 (in this case an enabling a transmission, ceases the previous transmission). For example, if beacon B0 is the initial protocol and data, after the interval of transmission has been completed, the beacon controller 705 retrieves beacon B1 protocol and data and propagates the data to the BLE Sub-system 700. The beacon controller 705 continually cycles through the set of beacon B0 . . . BN protocols and data, such that the process repeats until terminated.

Although, the above exemplary disclosure has been discussed with reference to Bluetooth Low Energy (BLE) and beacon technology, the concepts are generally applicable to any system that is designed to repeat a given transmission. That is, the disclosure is not limited to BLE systems and beacon technology.

Figure 8:
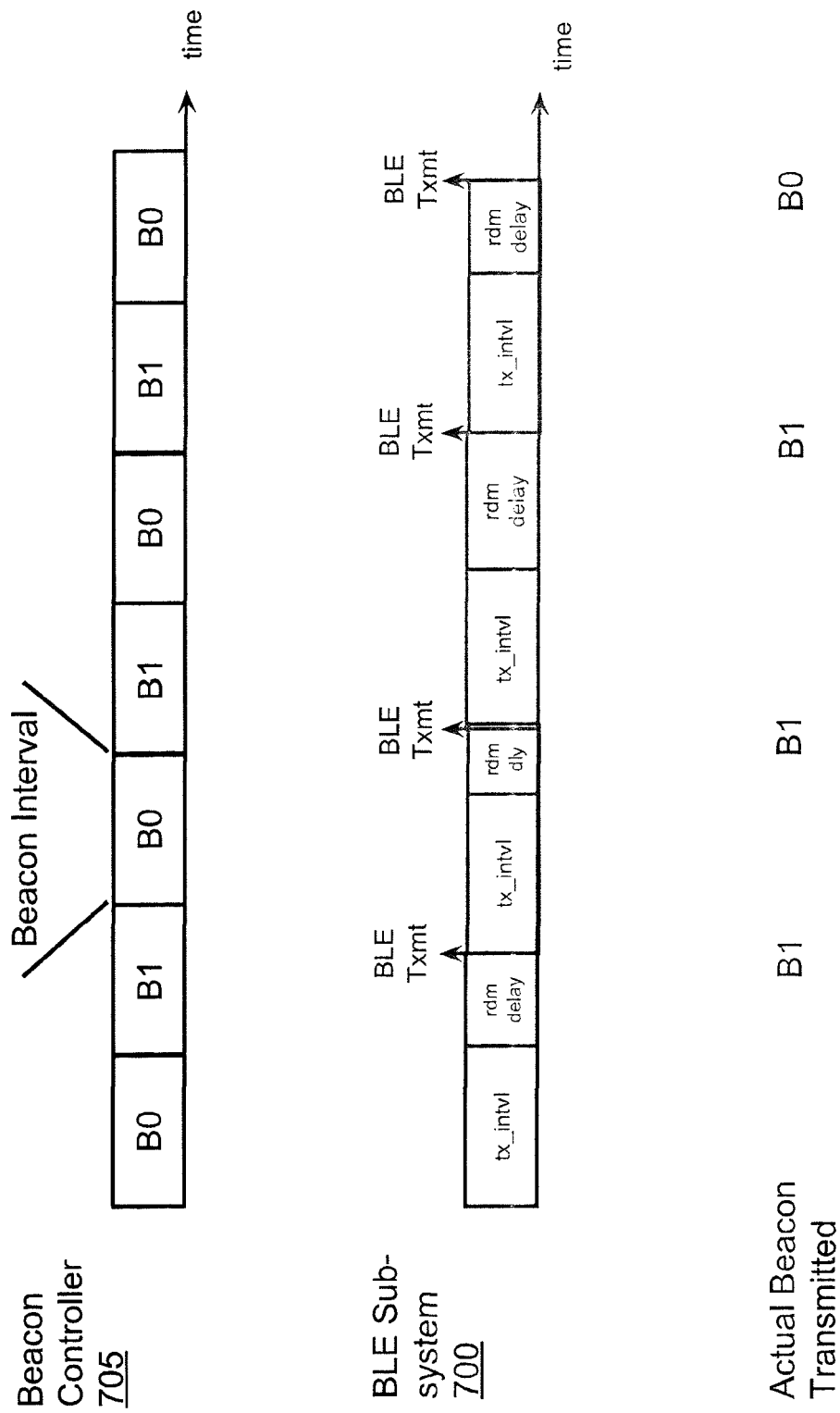
FIG. 8 shows an exemplary diagram in which signals are interleaved in accordance with one embodiment of the disclosure.

FIG. 8 shows an exemplary diagram in which signals are interleaved in accordance with one embodiment of the disclosure. In one exemplary embodiment, two beacon protocols and data, are represented by B0, B1, the beacons are rotated according to a fixed beacon interval, and the physical BLE transmit interval tx_intvl that includes a random delay is used by the BLE Sub-system 700. It is appreciated that the disclosed embodiment illustrates a non-limiting two beacon example. However, any number of beacons B0-BN may be used in the system, as the system is not limited to a two beacon approach. More specifically, FIG. 8 illustrates transmission from beacon controller 705 including two different beacon protocols B0 and B1. The BLE Sub-system 700, using the beacon protocols B0 and B1 provided by the beacon controller 705, transmits the beacon protocols B0 and B1 at various intervals, depicted as the actual beacon transmitted.

In the exemplary embodiment, the beacon interval B0/B1 alternates between two different beacons B0/B 1 in the beacon controller 705. However, the actual beacon information being transmitted is often not simply alternating between the two different beacons B0/B1. Rather, instead of transmitting the beacon as B0-B1-B0-B1 (beacon controller), the actual transmission may be, for example, B1-B1-B1-B0 (as depicted). Accordingly, the BLE Sub-system's 700 transmit interval (including any random delay) should be accounted for in the beacon controller's 705 logic when setting the beacon interval. Furthermore, it may be desirable for the BLE Sub-system 700 to transmit multiple times on a particular beacon before switching to another beacon. For example, rather than transmitting the beacons in the following order of B0-B1-B0-B1-B0-B1-B0-B1-B0, it may be preferable to transmit the beacons as B0-B0-B0-B1-B1-B1-B0-B0-B0.

The beacon controller 705, in order to control the transmission of multiple beacons (i.e., in order to interleave beacons), includes a set of instructions or algorithm that is executed by a processor such that the beacon controller 705 can be configured to at least maximize the likelihood of the following:

Be synchronized with the BLE transmit interval;
Adapt to the random delay added to the transmit interval;
Alternate beacons per BLE Sub-system transmission;
Have the BLE Sub-system generate a series of transmissions on a given beacon; and
Switch to an alternate beacon for a series of transmissions.

The following formula may be applied or additionally applied to the system in order to optimize beacon interleaving to the BLE Sub-system 700 transmission interval.

$$\text{Beacon Interval} = (\text{Repeat Factor}) * (\text{BLE Txmt Interval} + \text{Delay Offset Factor})$$

In the above formula, a Repeat Factor represents an approximation of how many times a BLE transmission should use a given Beacon protocol and data. For example, beacon factor of two (2) would result (on average) in each beacon be transmitted on two consecutive BLE transmissions before switching to the next beacon protocol and data. A BLE Txmt Interval ('tx_intvl') is the BLE Sub-system's 700 transmission interval, not including the random delay factor. This factor keeps the beacon interval "in tune" with the underlying BLE Sub-system's 700 transmission interval. A Delay Offset Factor ('rdm delay') can be used, for example, to compensate for the random delay. For example, one setting for the Delay Offset Factor could be ½ of the maximum random delay, which is equivalent to the expected average delay (assuming, for example, the random delay is a uniform probability distribution). This provides the ability to keep the beacon interval in synchronization with the underlying BLE Sub-system 700. A beacon interval is defined, for example, as calculating the formula results in a time interval that the beacon controller 705 can use for switching between beacons.

Beacon Rate Matching of a Stand-Alone Beacon

The beacon interleave approach discussed above may result in a slower beacon rate for a given BLE Transmission interval. The slower beacon rate may occur because that BLE Transmission interval is shared by multiple beacons, each taking a turn to transmit. A slower beacon rate would likely affect a beacon client application, and thus should be accounted for. Since the beacon controller 705 will typically have the ability to control the BLE Sub-system 700 transmit interval, the beacon controller 705 would use the following formula to increase the underlying BLE Sub-system's rate of transmission:

$$\text{BLE Txmt Interval}_{multi} = \text{BLE Txmt Interval}_{single} / \text{Number of Interleaved Beacons}$$

For example, in one exemplary embodiment, a single beacon device BLE Sub-system transmits its beacon information with an interval of 500 milliseconds (i.e., a rate of 2 per second). Then, a interleaved beacon device transmitting 4 beacons would need to have its BLE Sub-system transmit at 125 milliseconds (500 ms/4), which is a rate of 8 BLE Sub-system transmissions per second.

Additional embodiments are also disclosed below with reference to various figures.

Beacon Cycling

In the non-limiting embodiments disclosed above, the beacons cycle in a repeated order. For example, if there were 4 beacon types: B0, B1, B2, B3, then the beacons would cycle as: B0, B1, B2, B3, B0, B1, B2, B3, B0, B1 . . . . However, the disclosure is not limited to such repeated order embodiment. The system may also generate other cycling orders and algorithms, and even dynamically alter the cycling.

For example, cycling in a different order may appear as:
B0, B1, B2, B3, B3, B2, B1, B0, B0, B1, B2 . . . .

Cycling using different algorithms may appear, for example, as:
B0, B3, B3, B1, B2, B0 (each beacon determined at random),
B0, B1, B1, B2, B2, B2, B3, B3, B3, B3, B0, B0, B0, B0, B0 . . . .

Dynamically altering beacons may appear, for example, as:
B0, B1, B2, B3, B0, B1, B2, B3, B5, B1, B2, B3, B5, B1, B2, B3 (B5 replaces B0),
B0, B1, B2, B3, B0, B1, B2, B0, B1, B0, B1, B0, B1 (removing B2 and B3 from cycling),
B0, B0, B0, B0, B1, B0, B1, B0 (adding beacons to the cycle . . . .

Additional Embodiments to the BLE Sub-System

Figure 6C:
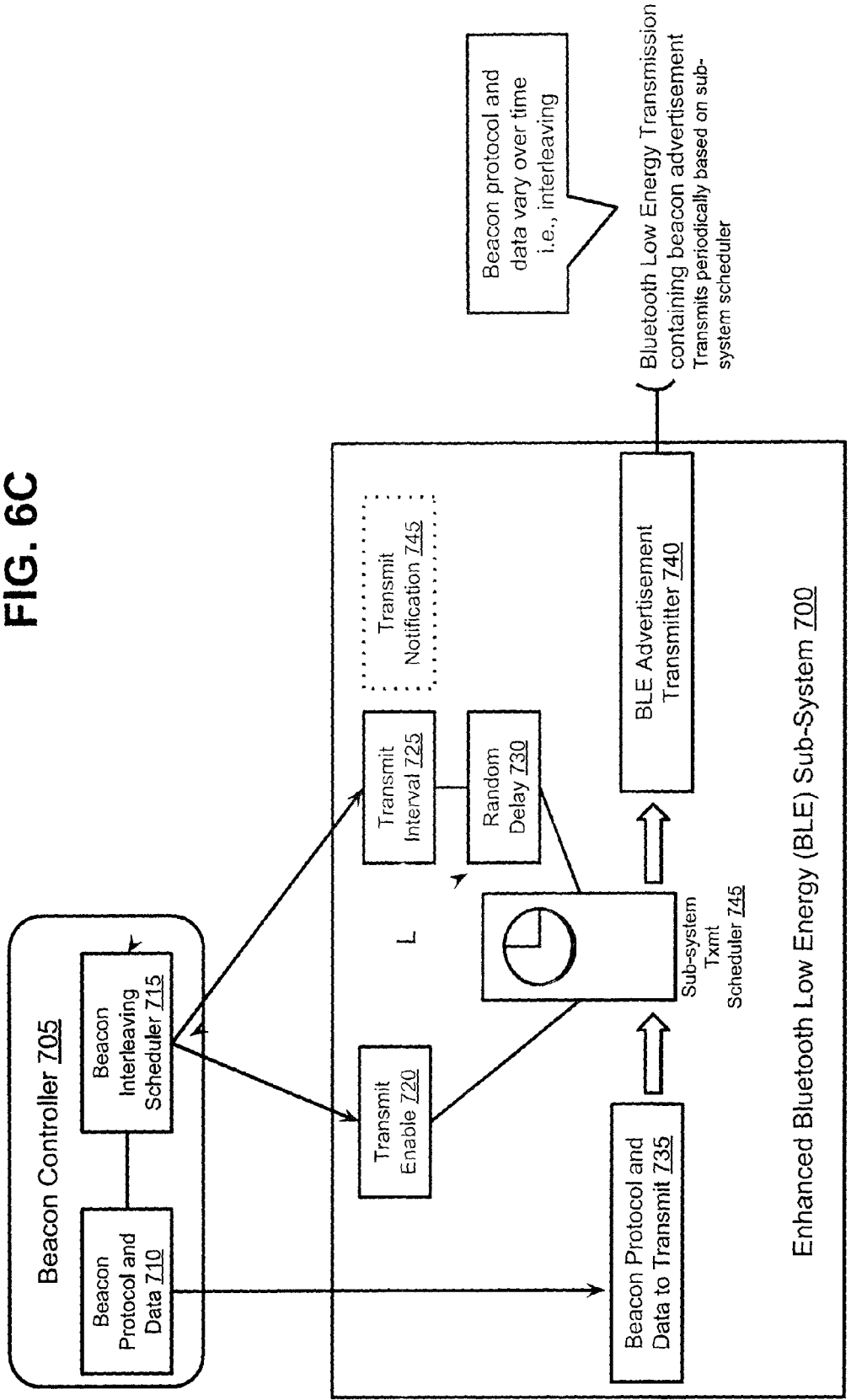
FIG. 6C shows an exemplary system with a controller and mobile device in accordance with another embodiment of the disclosure.

In the non-limiting exemplary embodiments disclosed above, a minimally compliant BLE Sub-system is discussed as part of the overall system. However, as appreciated by the skilled artisan, the system is not limited to a minimally compliant BLE Sub-system. Rather, any BLE Sub-system may be utilized. For example, in one exemplary embodiment illustrated in FIG. 6C, there is an exemplary system in which two additional capabilities (represented by dotted lines) supplement the features illustrated in FIG. 6A. These additional features could be used either alone or together. The features consist of, but are not limited to:

1. A transmit notification component 745 that is configured to notify a controller when a given transmission was transmitted; and
2. Coordination of the random delay between the beacon controller 705 and the BLE Sub-system 700, as represented by the dotted line L. Coordination could be accomplished, for example, by the beacon controller 705 providing the (pseudo-) random value to be used for the random delay 730, or the BLE Sub-system 700 providing the beacon controller 705 with a deterministic algorithm for generating the random delay 730 (i.e., the controller could predict the delay value), or by the BLE Sub-system 700 providing the beacon controller 705 with the delay value directly.

For example, in scenario (1) above, if a transmit notification 745 notifies the beacon controller 705, the beacon controller 705 could then alter the beacon protocol and data upon receipt of one or more notifications. In scenario (2) above, if the random delay 730 is coordinated, the beacon controller 705 is aware of the time when a transmission was generated and may synchronize the beacon protocol and data changes with the underlying BLE Sub-system 700 transmissions.

Managing Beacon Protocol and Data

The system disclosed above could also be augmented to better manage the protocol and data for more sophisticated beacons. For example, the system could be augmented in the following manner (although not limited thereto):

Managing only differences between protocols and data, rather than treating different protocols and data as separate entities. For example, if one protocol had substantial structural overlap with another, the common structure could be shared between both protocols.

Include computational logic structures inside the beacon protocols and data. For example, a beacon protocol that has a component to hold counter data, where the counter is incremented once a second (or other interval).

Common Configuration API

Often it is useful if data held by the beacon protocols is managed by the actual user of the beacon, either by a BLE client using Bluetooth protocols, or by a specific configuration or application. Additionally, it is common for a multi-beacon system to be employed solely as a multi-protocol system where the data across the protocols has common meaning to the user, but there is a need to deliver beacon transmissions to receivers with different protocols. For that particular use case, it would be beneficial to provide users a single interface for managing the beacon data and have an automated management system that configured the data to the appropriate beacon protocols.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The preceding description of the disclosed embodiments is provided to enable any person skilled in the art to make or use the present disclosure. As such, the above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method of broadcasting a plurality of data packets at periodic intervals, comprising:
setting a transmission interval of at least one data packet such that a transmission rate of the at least one data packet is compatible with a receiver rate of a receiving device within a transmission range of the at least one data packet;
populating a portion of the at least one data packet with a first protocol, the first protocol including first protocol data;
enabling transmission of the populated at least one data packet and transmitting the populated at least one data packet; and
after delaying for an interleave interval, which is a function of the transmission interval and a repeated number of times the at least one data packet is broadcast, populating the at least one data packet with a second protocol including second protocol data.

2. The method according to claim 1, wherein the at least one data packet conforms to a BLE protocol.

3. The method according to claim 2, wherein the first protocol is an AltBeacon protocol and the second protocol is a protocol different from the AltBeacon protocol.

4. The method according to claim 3, wherein the portion of the at least one data packet is a BLE advertisement.

5. The method according to claim 3, further comprising broadcasting the at least one data packet at the transmission interval.

6. The method according claim 2, wherein the first protocol data is first beacon data and the second protocol data is second beacon data, different from the first beacon data.

7. The method according to claim 1, wherein the transmission interval is:

BLE Txmt Interval$_{multi}$=BLE Txmt Interval$_{single}$/Number of Interleaved Beacons.

8. The method according to claim 1, wherein the interleave interval is:

Beacon Interval=(Repeat Factor)*(BLE Txmt Interval+Delay Offset Factor).

9. The method according to claim 1, wherein the transmission interval includes at least one of a random delay and coordinated random delay, wherein the coordinated random delay is one of a pseudo-random value and a program generating a random delay.

10. The method according to claim 1, wherein a transmit notification is provided upon transmission of the populated at least one data packet.

11. A non-transitory computer readable medium storing a program for broadcasting a plurality of data packets at periodic intervals, the program when executed by a processor comprising:

setting a transmission interval of at least one data packet such that a transmission rate of the at least one data packet is compatible with a receiver rate of a receiving device within a transmission range of the at least one data packet;

populating a portion of the at least one data packet with a first protocol, the first protocol including first protocol data;

enabling transmission of the populated at least one data packet and transmitting the populated at least one data packet; and after delaying for an interleave interval, which is a function of the transmission interval and a repeated number of times the at least one data packet is broadcast, populating the at least one data packet with a second protocol including second protocol data.

12. The non-transitory computer readable medium according to claim 11, wherein the at least one data packet conforms to a BLE protocol.

13. The non-transitory computer readable medium according to claim 12, wherein the first protocol is an AltBeacon protocol and the second protocol is a protocol different from the AltBeacon protocol.

14. The non-transitory computer readable medium according to claim 13, wherein the portion of the at least one data packet is a BLE advertisement.

15. The non-transitory computer readable medium according to claim 13, further comprising broadcasting the at least one data packet at the transmission interval.

16. The non-transitory computer readable medium according claim 12, wherein the first protocol data is first beacon data and the second protocol data is second beacon data, different from the first beacon data.

17. The non-transitory computer readable medium according to claim 11, wherein the transmission interval is:

$$\text{BLE Txmt Interval}_{multi} = \text{BLE Txmt Interval}_{single} / \text{Number of Interleaved Beacons}.$$

18. The non-transitory computer readable medium according to claim 11, wherein the interleave interval is:

$$\text{Beacon Interval} = (\text{Repeat Factor}) * (\text{BLE Txmt Interval} + \text{Delay Offset Factor}).$$

19. The non-transitory computer readable medium according to claim 11, wherein the transmission interval includes at least one of a random delay and coordinated random delay, wherein the coordinated random delay is one of a pseudo-random value and a program generating a random delay.

20. The non-transitory computer readable medium according to claim 11, wherein a transmit notification is provided upon transmission of the populated at least one data packet.

21. A device for broadcasting a plurality of data packets at periodic intervals, comprising:

a controller to:

set a transmission interval of at least one data packet such that a transmission rate of the at least one data packet is compatible with a receiver rate of a receiving device within a transmission range of the at least one data packet;

populate a portion of the at least one data packet with a first protocol, the first protocol including first protocol data;

enable transmission of the populated at least one data packet and transmitting the populated at least one data packet; and after delaying for an interleave interval, which is a function of the transmission interval and a repeated number of times the at least one data packet is broadcast, populate the at least one data packet with a second protocol including second protocol data.

22. The device according to claim 21, wherein the at least one data packet conforms to a BLE protocol.

23. The device according to claim 22, wherein the first protocol is an AltBeacon protocol and the second protocol is a protocol different from the AltBeacon protocol.

24. The device according to claim 23, wherein the portion of the at least one data packet is a BLE advertisement.

25. The device according to claim 23, further comprising a sub-system to broadcast the at least one data packet at the transmission interval.

26. The device according claim 22, wherein the first protocol data is first beacon data and the second protocol data is second beacon data, different from the first beacon data.

27. The device according to claim 21, wherein the transmission interval is:

$$\text{BLE Txmt Interval}_{multi} = \text{BLE Txmt Interval}_{single} / \text{Number of Interleaved Beacons}.$$

28. The device according to claim 21, wherein the interleave interval is:

$$\text{Beacon Interval} = (\text{Repeat Factor}) * (\text{BLE Txmt Interval} + \text{Delay Offset Factor}).$$

29. The device according to claim 21, wherein the transmission interval includes at least one of a random delay and coordinated random delay, wherein the coordinated random delay is one of a pseudo-random value and a program generating a random delay.

30. The device according to claim 21, wherein a transmit notification is provided upon transmission of the populated at least one data packet.

* * * * *